US010114469B2

(12) United States Patent
Chang

(10) Patent No.: US 10,114,469 B2
(45) Date of Patent: Oct. 30, 2018

(54) INPUT METHOD TOUCH DEVICE USING THE INPUT METHOD, GESTURE DETECTING DEVICE, COMPUTER-READABLE RECORDING MEDIUM, AND COMPUTER PROGRAM PRODUCT

(71) Applicant: iDESYN Semiconductor Corp., Zhubei, Hsinchu County (TW)

(72) Inventor: You-He Chang, Zhubei (TW)

(73) Assignee: IDESYN SEMICONDUCTOR CORP., Zhubei, Hsinchu County (TW)

( * ) Notice: Subject to any disclaimer, the term of this patent is extended or adjusted under 35 U.S.C. 154(b) by 1 day.

(21) Appl. No.: 15/497,487

(22) Filed: Apr. 26, 2017

(65) Prior Publication Data

US 2018/0188814 A1 Jul. 5, 2018

(30) Foreign Application Priority Data

Dec. 30, 2016 (TW) .............................. 105144196 A

(51) Int. Cl.
*G06F 3/01* (2006.01)
*G06F 3/00* (2006.01)
*G06F 3/041* (2006.01)
*G06F 3/0488* (2013.01)

(52) U.S. Cl.
CPC .............. *G06F 3/017* (2013.01); *G06F 3/005* (2013.01); *G06F 3/041* (2013.01); *G06F 3/04883* (2013.01)

(58) Field of Classification Search
CPC .......... G06F 3/017; G06F 3/041–3/047; G06F 3/04883

USPC .................................... 345/173–178; 715/863
See application file for complete search history.

(56) References Cited

U.S. PATENT DOCUMENTS

| 5,933,149 A * | 8/1999 | Mori .................. G06K 9/00416 345/442 |
| 6,278,445 B1 * | 8/2001 | Tanaka ................ G06F 3/04883 345/177 |
| 7,456,849 B2 * | 11/2008 | Brooke ................. G06F 3/0481 345/661 |

(Continued)

FOREIGN PATENT DOCUMENTS

TW 201443762 11/2014

*Primary Examiner* — Michael Pervan
(74) *Attorney, Agent, or Firm* — Muncy, Geissler, Olds & Lowe, P.C.

(57) ABSTRACT

An input method for being loaded into a processor to execute following steps: triggering an input device to perform a gesture input process, comprising: recording a triggered site of a gesture as a sampling point once every unit of time, and recording a turn variation of an interval link between one said sampling point and a next said sampling point; comparing the turn variation to a variation threshold, and when the turn variation is greater than the variation threshold, marking the relevant sampling points as a featured sampling point; chronologically linking plural said featured sampling points into featured line segments, recording proportions of lengths of the featured line segments, and forming a graphic code according to the proportions; and comparing the graphic code to codes contained in a lookup table, so as to perform a predefined function represented by the graphic code.

14 Claims, 10 Drawing Sheets

(56) References Cited

U.S. PATENT DOCUMENTS

| | | | | |
|---|---|---|---|---|
| 2002/0141643 A1* | 10/2002 | Jaeger | ................... | G06F 3/0481 |
| | | | | 382/181 |
| 2008/0192005 A1* | 8/2008 | Elgoyhen | ................ | G06F 3/014 |
| | | | | 345/158 |
| 2013/0002600 A1* | 1/2013 | McCracken | ............ | G06F 3/044 |
| | | | | 345/174 |
| 2014/0331190 A1* | 11/2014 | Chang | ................... | G06F 3/0488 |
| | | | | 715/863 |

* cited by examiner

INPUT METHOD TOUCH DEVICE USING THE INPUT METHOD, GESTURE DETECTING DEVICE, COMPUTER-READABLE RECORDING MEDIUM, AND COMPUTER PROGRAM PRODUCT

BACKGROUND OF THE INVENTION

1. Technical Field

The present invention relates to an input method, touch device using the input method and gesture detecting device, and more particularly to an input method that has improved recognition accuracy for graphic (or linear) features and touch device using the input method and a gesture detecting device.

2. Description of Related Art

The vigorous development of touch technology has driven the industry of consumer electronics to grow rapidly. As proven by the current market trend, touch technology has been used for various applications in our daily life. With the progress of technology, the commercially available touch-based applications have expanded to single-touch operation to multi-touch operation, and more and more operational gestures are becoming readable. All these developments require increasingly complicated gesture-recognizing algorithms.

The existing gesture-recognizing schemes usually begin after a user finishes his/her input (i.e. after his/her finger or penpoint leaves the surface of the touch panel). The known schemes then perform graphic recognition to the track of the gesture made by the user. By memorizing the graphic and comparing it to a database built upon a large amount of tests, the graphic input by the gesture can be recognized. However, the prior-art algorithmic process is very complicated, and thus requires huge resources for graphic recognition (e.g. CPU resources and RAM space), making graphic recognition time- and resource-consuming.

In view of this, Taiwan Patent Application Publication No. 201443762 proposes a method for operating multi-touch devices. The known method involves capturing a plurality of track points to build a track formula for calculating a primary differential value and a secondary differential value, and determining the pattern of the non-linear track according to moving time, the primary differential value and the secondary differential value, so as to perform or activate the relevant program as predetermined. This approach provides better recognition than the traditional methods, and features accelerated recognition and reduced misoperation.

However, in all the existing methods, the number of sampling points varies with users' operating speed, and this adds difficulty to graphic recognition. In addition, even the same user may not always input graphics in the same size. When the input graphic is larger or smaller than the preset size, the recognition result may be less reliable due to poor or fault determination.

SUMMARY OF THE INVENTION

The primary objective of the present invention is to provide an approach to recognition of graphics and lines input to a touch device that is faster and more accurate as compared to the prior art.

In order to solve the above mentioned problem, the present invention provides an input method for being loaded into a processor to execute following steps: triggering an input device to perform a gesture input process, comprising: recording a triggered site on the touch device caused by a contact point as a sampling point once every unit of time, and recording a turn variation of an interval link between one said sampling point and a next said sampling point; comparing the turn variation to a variation threshold, and when the turn variation is greater than the variation threshold, marking the relevant sampling points as a featured sampling point; chronologically linking plural said featured sampling points into featured line segments, recording proportions of lengths of the featured line segments, and forming a graphic code according to the proportions; and comparing the graphic code to codes contained in a lookup table, so as to perform a predefined function represented by the graphic code.

Preferably, the turn variation is a difference between an included angle between one said interval link and a datum line and an included angle between a previous said interval link and the datum line.

Preferably, when the turn variation has a change in positive/negative valence from the previous turn variation, the sampling point is also marked as the featured sampling point.

Preferably, the gesture input process further comprises a step of determination that includes recording directions of the featured line segments or included angles between each two said featured line segments as an auxiliary parameter, and inserting the auxiliary parameter into the graphic code that is later compared to the code contained in lookup table.

Preferably, the gesture input process is triggered to execute when a first gesture state is detected.

Preferably, the method further comprises a step of setting a time threshold, wherein when a second gesture state is detected, a time parameter is triggered and recorded, and when the time parameter is within the time threshold and the first gesture state is re-detected, an interval code corresponding to an interval between the previous and the present featured line segment are inserted into the graphic code.

Preferably, when the time parameter exceeds the time threshold, the graphic code is stored and compared to the code contained in the lookup table.

Preferably, the method further comprises a step of setting a time threshold, wherein when a second gesture state is detected, a time parameter is triggered and recorded, and when the time parameter is within the time threshold and the first gesture state is re-detected, the triggered site of the second gesture state and the triggered site of the re-detected first gesture state are linked to get a virtual line segment, and a length of the virtual line segment is recoded and used to form the graphic code together with the featured line segment according to the proportions.

Preferably, a direction of the virtual line segment or an included angle between the virtual line segment and an adjacent said featured line segment is recorded as an auxiliary parameter, and the auxiliary parameter is inserted into the graphic code that is later compared to the codes contained in the lookup table.

Preferably, when the time parameter exceeds the time threshold, the graphic code is stored and compared to the codes contained in the lookup table.

Preferably, the input device can be a touch screen or an image capture device.

Another aspect of the invention is to provide a non-transitory computer-readable recording medium, having a program recorded therein, and being configured to perform the method of the present invention when an electronic device has been loaded with and has executed the program.

Another aspect of the invention is to provide a computer program product, being configured to execute the method of the present invention when being loaded into and executed by an electronic device.

Another aspect of the invention is to provide a touch device, comprising: a touch screen and a processor connected to the touch screen. The touch screen has an array for detecting triggered sites of contact points between a finger or a penpoint and the touch screen. The processor can perform the method of the present invention when being loaded with a program.

Another aspect of the present invention is to provide a gesture detecting device, comprising: an image capture device and a processor connected to image capture device. The image capture device is for consecutively capturing user's image. The processor executes the methods of the present invention when being loaded with a program and searching out an user's gesture from the user's image.

The present invention is superior to the prior art in the following respects:

1. The present invention solves the problems about too many or too few sampling points captured due to the varying speed of a user's input (e.g. by handwriting), and about difficulty in recognition due to the varying size of input graphics.

2. The input method of the present invention simplifies graphic recognition, and uses a special sampling scheme based on proportions of graphics and lines to improve recognition accuracy.

3. The present invention provides accurate recognition for single-touch-single-stroke operation, single-touch-multi-stroke operation, and multi-touch-single-stroke operation, and thus is much more extensively applicable application than the prior art.

DETAILED DESCRIPTION OF THE INVENTION

The details and technical solution of the present invention are hereunder described with reference to accompanying drawings. For illustrative sake, the accompanying drawings are not drawn to scale. The accompanying drawings and the scale thereof are restrictive of the present invention.

Figure 1:
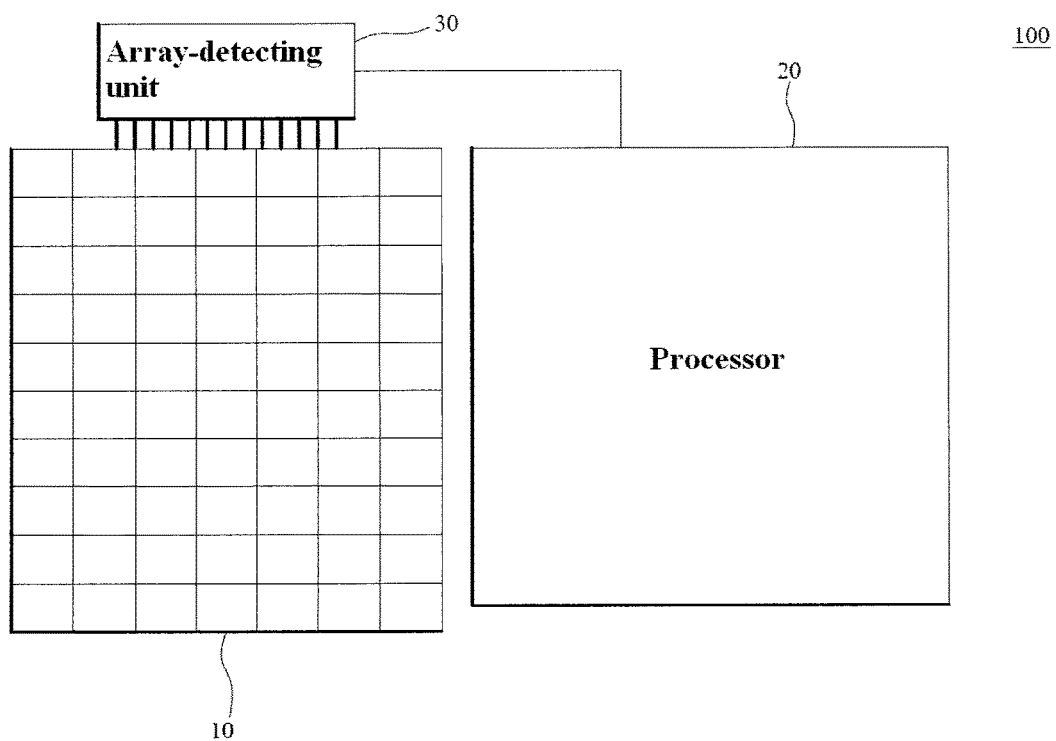
FIG. 1 is a block diagram illustrating a touch device according to the present invention.

FIG. 1 is a block diagram illustrating a touch device according to the present invention.

The present invention provides a touch device 100 which at least comprises a touch screen 10 and a processor 20 connected to the touch screen 10. The touch device 100 may be a mobile device (such as a mobile phone, a tablet computer, an MP3 device, an MP4 device, etc.), a computer (such as a desktop computer, a notebook computer, etc.), an input board, or a touch panel, and is not limited thereto. Through the touch screen 10, a user can uses a stylus pen (either an active or a passive one) or his/her finger to input a graphic or a gesture, so as to activate a function corresponding to that graphic or gesture as predefined. The predefined function may be search for a program, an image, or a link represented by the input graphic, or activation of a corresponding program, image, or link in the device using a lookup table.

The touch screen 10 has a two-dimensional array for detecting a triggered site of a contact point between the user's finger or the penpoint and the touch screen 10. The touch screen 10 may be of the capacitive-touch type, the resistive-touch type, the optical type, or one working based on surface acoustic waves, and is not limited thereto. The touch screen 10 has an array-detecting unit 30. The array-detecting unit 30 detects a contact point between the finger or stylus pen and the touch screen 10 and accordingly calculates an actual coordinate set (representing the triggered site) on the touch screen 10, so as to use plural contact points to determine the moving track of the finger or stylus pen on the touch screen 10.

The processor 20 may comprise a storage unit. The processor 20 may be a central processing unit (CPU), a programmable and general or special microprocessor, a digital signal processor (DSP), an application specific integrated circuits (ASIC), a programmable logic device (PLD) or something the like or a combination thereof. The storage unit may be a movable or fixed random access memory (RAM), a read-only memory (ROM), a flash memory or something the like or a combination thereof. The storage unit may be composed of one or more accessible non-volatile memory components. In particular, it may be a hard drive, a memory card, an integrated circuit or firmware, and is not limited thereto.

Figure 2:
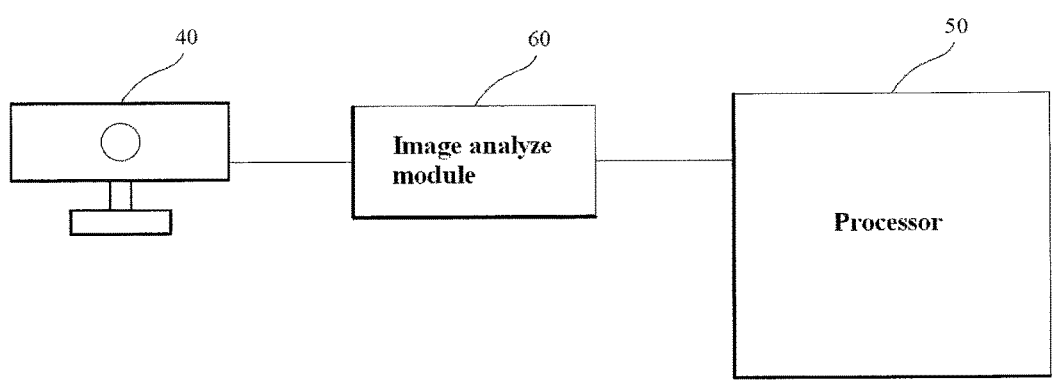
FIG. 2 is a block diagram illustrating a gesture detecting device.

Another preferred embodiment is shown in FIG. 2, disclosing the block diagram illustrating a gesture detecting device. As FIG. 2 shows:

The present invention provides a gesture detecting device 200, comprising at least an image capture device 40 and a processor 50 connected to the image capture device 40. The gesture detecting device 200 captures the user's image so as to obtain the user's gesture motion, so that the user can input orders by gesture motions. Through the image capture device 40, the user can input orders by the gesture motions and the device can perform a predefined function corresponding to an image represented by the gesture motion. The predefined function described herein may to search for a program, image, or link corresponding to the input graphics, or to find a program, image, or link corresponding to the graphics directly through the lookup table, so that the device can be operated through the user's gesture motion.

The image capture device 40 is for consecutively capturing the user's images so that the processor 50 can later analyze the user's image and capture the user's gesture motion. The processor 50 can be Charge-coupled Device (CCD), Complementary Metal-Oxide-Semiconductor (CMOS), or depth camera or stereoscopic camera which analyses three dimensional images, and is not limited thereto.

The said processor 50 includes a storage unit. The processor 50 can be Central Processing Unit (CPU), or other similar units which are programmable for general use or special use, such as Mircroprocessor, Digital Signal Processor (DSP), Application Specific Integrated Circuits (ASIC), and Programmable Logic Device (PLD). The storage unit can be any type of fixed or movable Random Access Memory (RAM), Read-Only Memory (ROM), Flash Memory, other similar unit or combination thereof. The storage unit consists of at least one of storable non-volatile memory component. Specifically, the storage unit can be hard disc, memory card, integrated circuit or firmware, and is not limited thereto.

In the present embodiment, the gesture detecting device further includes an image analyze module 60, which performs image analyze process by searching the user's skeleton information or image features to obtain the user's hand features, and marking each of the user's hand features with a coordinate in a plurality of the images to obtain the user's gesture motion. The image analyze module 60 can be an independent computing unit for processing images or incorporated with a processor 50 to form a processor, or carried out as a software or firmware directly stored in the storage unit or burned in a processor so as to performing the corresponding orders after triggered.

Figure 3:
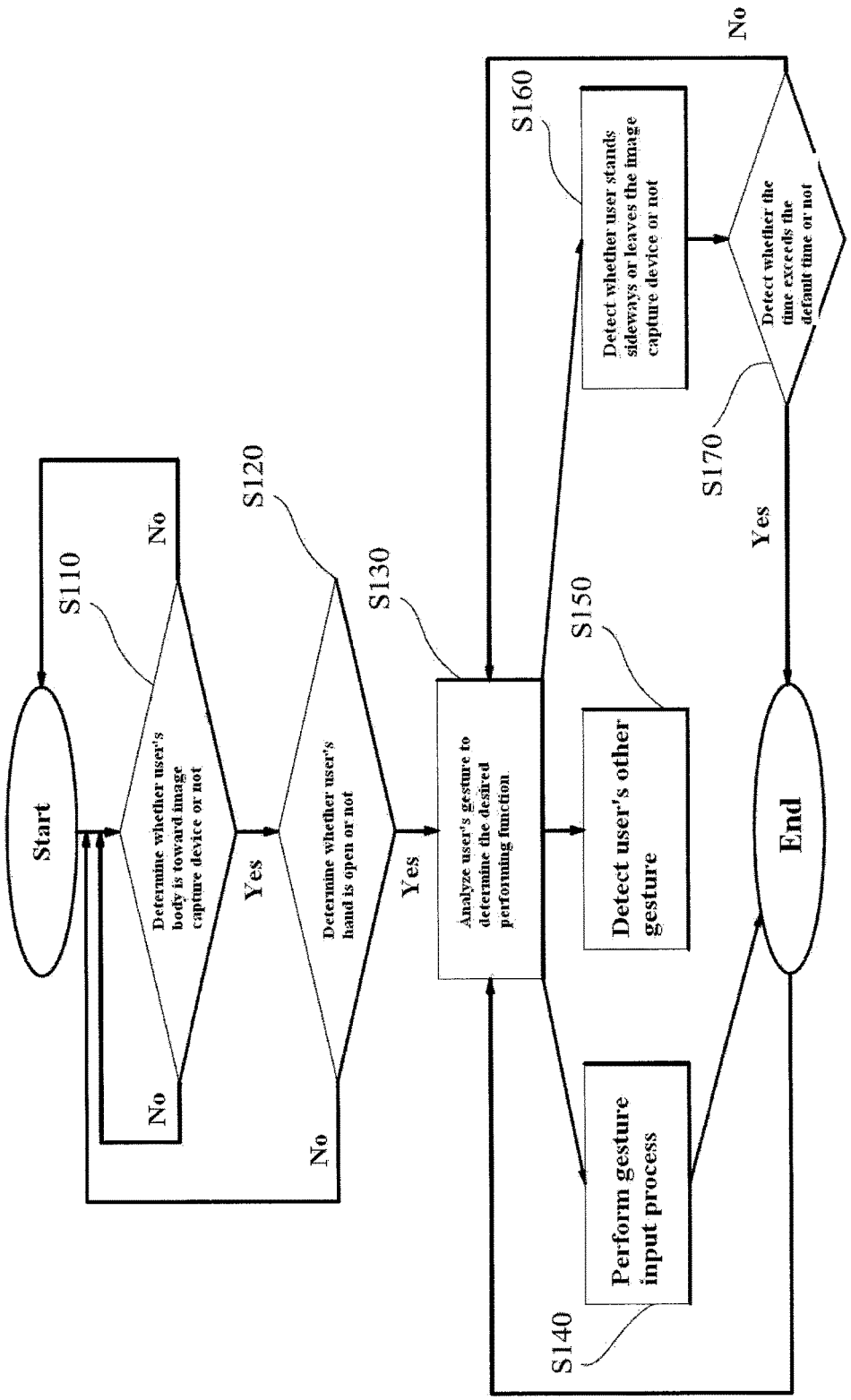
FIG. 3 is an algorithm flowchart of a gesture detecting device performing a gesture input process.

In the embodiment of the gesture detecting device 200, in order to determine the start point and end point when inputting the image, the image analyze module 60 uses the gesture motion and its triggered coordinate to determine the start point and end point, or directly input the start point and end point by the gesture performing order. The algorithm for gesture performing order shows in FIG. 3, which is the algorithm flow chart of the gesture detecting device 200 performing the gesture input process.

When the gesture detecting device 200 starts, the image analyze module 60 obtains the user's image and determines whether the user's body is toward the image capture device 40 (step S110) or not. When the image analyze module 60 detects that the user is toward the image capture device 40, it obtains the user's hand features and the coordinates of the user's hand features are continuously being tracked. If the image analyze module 60 does not detects that the user is toward the image capture device 40, the image analyze module 60 will repeatedly keep tracking the user's posture and determine whether the user is toward the image capture device 40 or not.

When tracking the coordinate of the user's hand features, whether the user's hand is open or not is determined (step S120); if the user's hand is open, the next step will be performed; if the user's hand is not open, the steps of S110 and S120 will be repeatedly performed.

When the user's hand is open, the desired performing function is determined according to the user's later gesture (Step S130). In a preferred embodiment, the gesture input process is performed (step S140) and whether the user's hand is in a first state or not is determined (first gesture state). When the user's hand clenched is detected, the gesture input process is triggered and perfoll led. When the user's open hand (second gesture state) is detected and the time of the open hand state exceeds the default time, the gesture input process is determined to be ended. The aforementioned first gesture state and second gesture state can be adjusted or changed according to the actual need, and is not limited to the state of clenched or open. Specifically, the first gesture state can also be a gesture with fingers showed out and the second gesture state can also be a gesture of hand clenched. The equivalent embodiment without leaving the main technical concept of the present invention should fall in the equivalent scope of the present invention.

In addition to the above mentioned detection of whether the hand state is clenched or not, other user's gestures can also be detected to determine the corresponding function that the user wants to perform. For instance, the options on the function list menu can be operated by the sway direction of the gesture or the point direction of the tracked finger, and is not limited thereto.

When performing the above various gesture determinations, the system at the same time performs the determination of the user's body posture for detecting whether the user stands sideways or leaves the image capture device 40 or not (S160). When detecting that the user stands sideways or leaves the image capture device 40, the timer starts to detect whether the time of the user standing sideways or leaving the image capture device 40 exceeds the default time or not (S170). When the time of user standing sideways or leaving the image capture device 40 exceeds the default time, the gesture input process ends. If the user toward the image capture device 40 again is detected before the default time, the timer stops and the gesture determination keeps performing (S130).

The following are the detailed description of the input method of the present invention:

The above embodiment can perform the input method of the present invention, and the gesture input process can be performed through the input method of the present invention. Specifically, the input method of the present invention can perform a gesture input process through recording the user's gesture motion. By the gesture input process, the input of the user's graphs or characters can be detected so as to start the corresponding predefined functions of the graphs or characters.

When starting the input method of the present invention, the gesture state must be determined whether it is for triggering and performing the gesture input process or not. Specifically, in the embodiment of the touching device, the gesture state is generally set as whether the fingers touch the touching screen or not. When the processor detects that the user touches the touching screen, it is determined that the user wants to start performing the gesture input process. In the embodiment of gesture detecting device, due to the non-contacting input manner, the gesture state in a preferred embodiment can be the user's gesture motion, such as clenching, so as to determine whether the user wants to start performing the gesture input process or not. In the embodiments of performing the locating which is part done by the assisting device, it can be determined whether to start the input process or not through whether the user pushes the button of the assisting device or not. The present invention has no limitation to the way of triggering the gesture input process.

Figure 4:
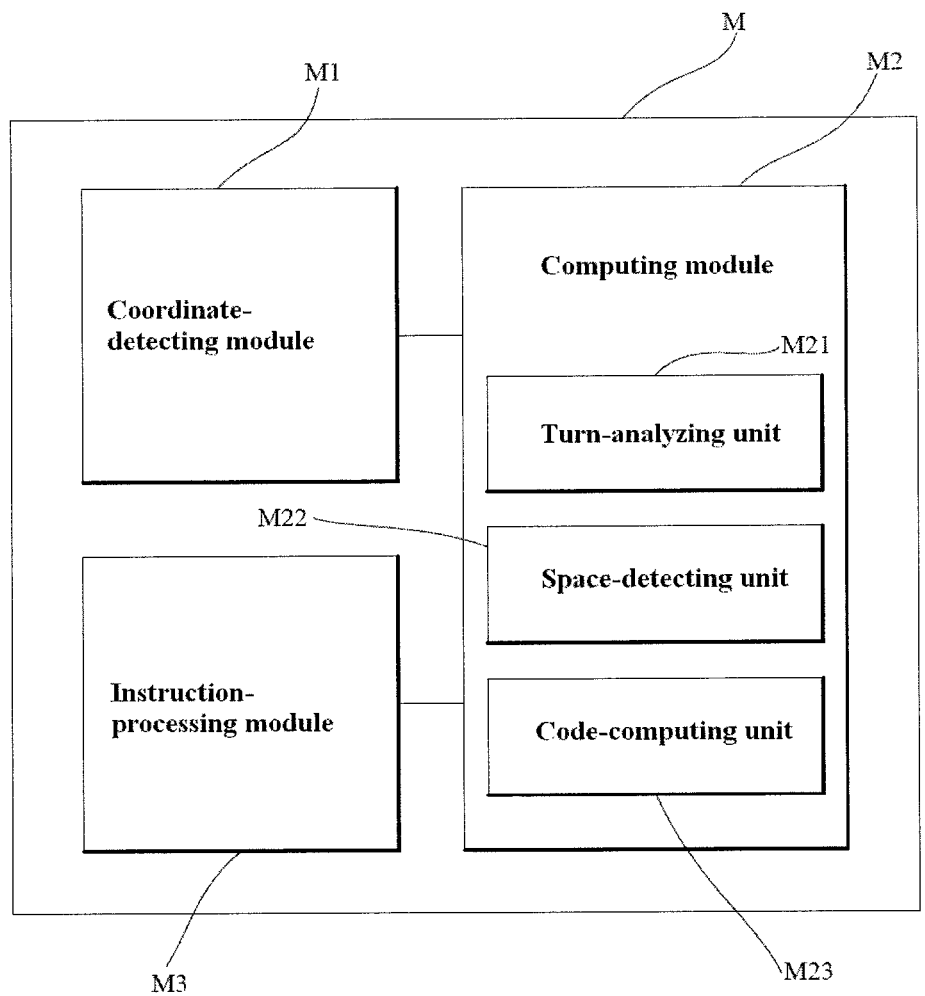
FIG. 4 is a function module diagram of a gesture input process.

Please refer to FIG. 4, which is the function module diagram of a gesture input process; as shown in FIG. 4:

According to the algorithm for the processor M (corresponding to the processor 20 of the first embodiment and processor 50 of the second embodiment) to perform the gesture input process, the processor M specifically includes the following functional modules: Coordinate-detecting module M1, Computing module M2, and Instruction-processing module M3.

(I) Coordinate-Detecting Module M1:

The coordinate-detecting module M1 serves to records a triggered site of a gesture at each unit of time, and save the triggered site as a sampling point. Also referring to FIG. 5, the processor M is connected to the array-detecting unit 30 (or image analyze module 60), and is triggered once by a timer every unit of time (e.g. once per 0.01 second). The unit of time may be varied according to the required recognition accuracy. For example, the time interval between two records may be reduced to get increased recognition accuracy. When triggered by the timer, the coordinate-detecting module M1 obtains every triggered site from the gestures, and records coordinate sets $N_0(x_0, y_0)$, $N_1(x_1, y_1)$, $N_2(x_2, y_2)$, . . . , $N_{n-1}(x_{n-1}, y_{n-1})$, $N_n(x_n, y_n)$ of the triggered sites chronologically (such as in a stacked manner), so as to save the records of the triggered sites as sampling points for the computing module M2 to later perform analytic and algorithmic operations thereon and get the graphic's track and shape.

(II) Computing Module M2:

The computing module M2, according to the performing function, mainly comprises a turn-analyzing unit M21, a space-detecting unit M22, and a code-computing unit M23. The computing module M2 performs geometric operation to capture major features of the track and shape of the graphic defined by the coordinate sets, thereby forming a specific graphic code.

1. Turn-Analyzing Unit M21

The turn-analyzing unit M21 serves to calculate a turn variation of an interval link between one said sampling point and a next said sampling point, and compare the turn variation to a variation threshold. When the turn variation is greater than the variation threshold or when the turn variation has a change in positive/negative valence from the previous turn variation, it marks the relevant sampling points as a featured sampling point, and chronologically link plural said featured sampling points into featured line segments. In one of the preferred aspects, the turn variation is a difference between an included angle between one said interval link and a datum line and an included angle between a previous said interval link and the datum line.

Figure 6:
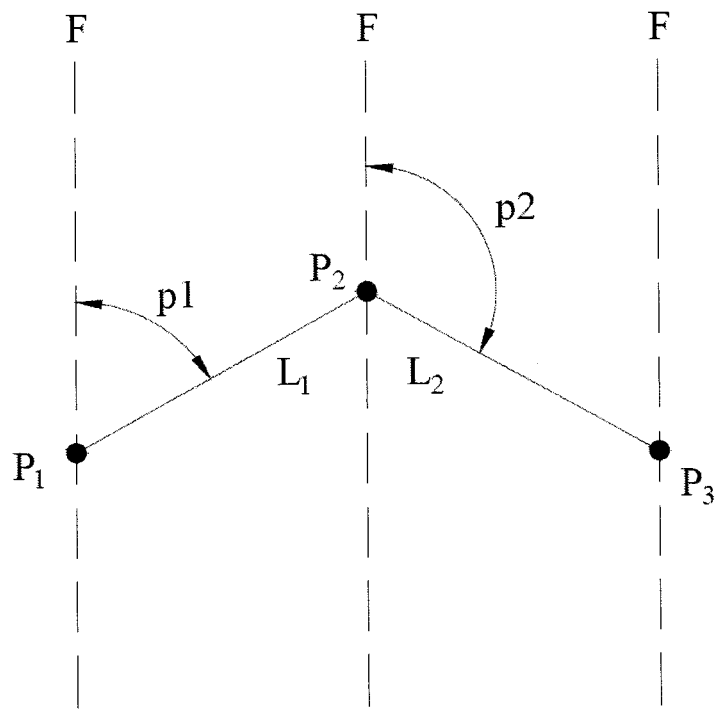
FIG. 6 shows a track of exemplificative (II) input graphic.

As shown in FIG. 6, the turn-analyzing unit M21 obtains three sampling points $P_1$, $P_2$ and $P_3$ at the coordinate-detecting module M1, and links the sampling points in a time-based sequence, thereby obtaining interval links $L_1$ and $L_2$. The sampling points are each set with a datum line F and the datum lines are of the same slope. The included angle p1 between the interval link $L_1$ and the datum line F, and the included angle p2 between the interval link $L_2$ and the datum line F are determined. Then subtraction is performed between p2 and p1 so as to get a difference (turn variation) between the included angles. At this time, of the difference between the included angles is greater than a variation threshold (as a predetermined parameter) or if the difference between the included angles has a change in positive/negative valence (i.e. becomes positive from negative or becomes negative from positive), the sampling point $P_2$ between the interval link $L_1$ and the interval link $L_2$ is marked as a featured sampling point.

Figure 7:
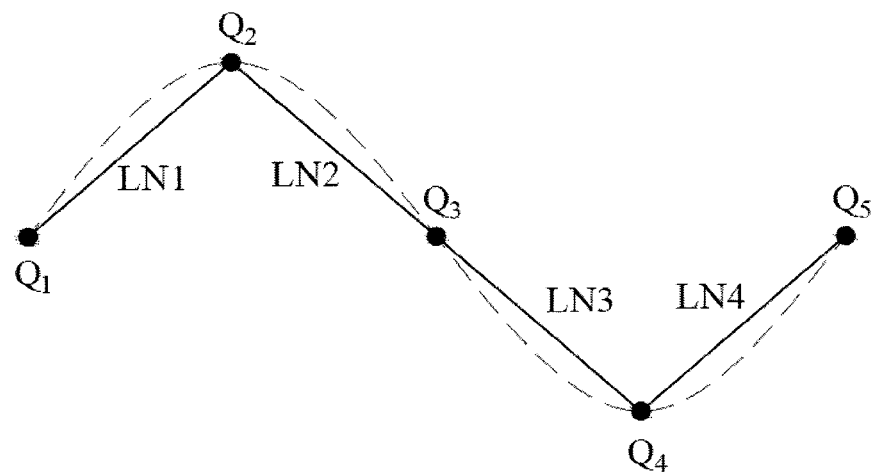
FIG. 7 shows a track of exemplificative (III) input graphic.
Figure 8:
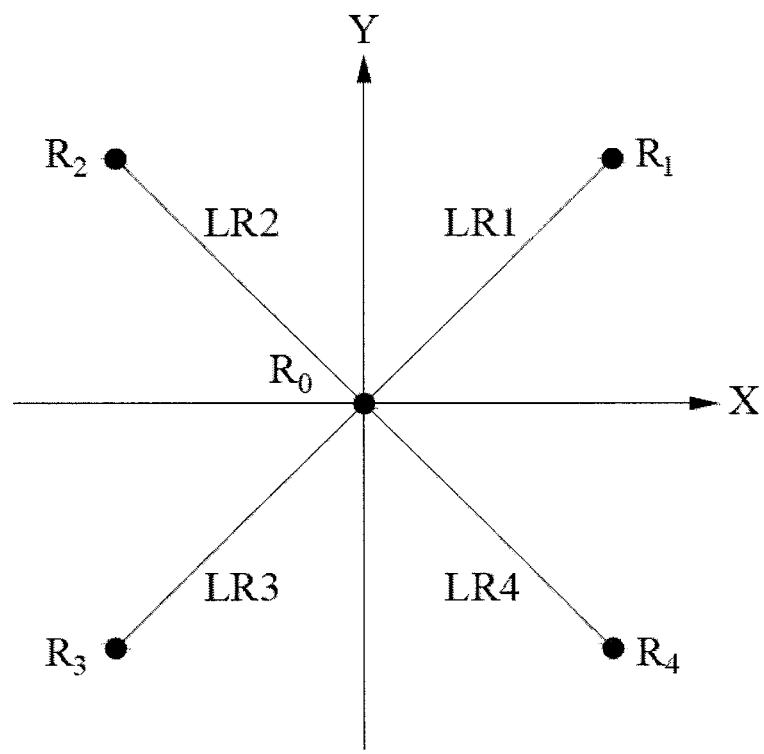
FIG. 8 shows a track of exemplificative (IV) input graphic.

As shown in FIG. 7, assuming that three featured sampling points $Q_2$, $Q_3$ and $Q_4$ from a continuous line segment are obtained after the foregoing algorithmic step, the turn-analyzing unit M21 further chronologically links the featured sampling points into featured line segments. It is to be noted that the start site and the end site of the continuous line segment should both be marked as featured sampling points ($Q_1$ and $Q_5$), so as to form a part of the featured line segment. By linking the featured sampling points $Q_1$ through $Q_5$ in sequence, four featured line segments LN1, LN2, LN3, and LN4 are obtained. With vectors, the lengths of the featured line segments LN1, LN2, LN3 and LN4 can be calculated using the equation below:

$$LN=\sqrt{(X_1-X_2)^2+(Y_1-Y_2)^2}$$

In the equation, LN is the length of the line segment, and $(X_1, Y_1)$ is the coordinate set of the end point of the vector (the next featured sampling point), while $(X_2, Y_2)$ is the coordinate set of the start point of the vector (the previous featured sampling point). The length of each of the featured line segments can be determined using the above equation.

Figure 5:
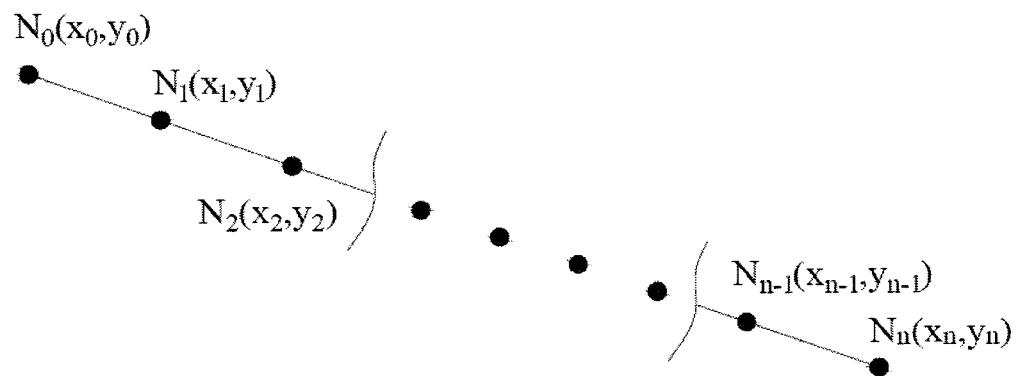
FIG. 5 shows a track of exemplificative (I) input graphic.

Since the proportions of line segments are not directional, for making the graphic code more accurate and reducing the risk of misdetermination (e.g. mirroring), the turn-analyzing unit M21 further performs a determination step. The directions of the featured line segments are recorded as an auxiliary parameter. Please refer to FIG. 5. The direction of the featured line segment can be determined using the vector of the coordinate sets between the featured sampling point and the previous featured sampling point. In the following description, featured sampling points are defined as coordinate sets $R_0$~$R_4$ for illustration. FIG. 5 shows four featured line segments LR1~LR4. Therein, LR1 is the link between the coordinate sets $R_0$ and $R_1$. LR2 is the link between the coordinate sets $R_0$ and $R_2$. LR3 is the link between the coordinate sets $R_0$ and $R_1$ LR4 is the link between the coordinate sets $R_0$ and $R_4$. By performing subtraction on the coordinate sets, vectors form $R_0$ to $R_1$, from $R_0$ to $R_2$, form $R_0$ to $R_3$, and from $R_0$ to $R_4$ are obtained. At this time, the positive/negative valence of the vector in the X direction and the positive/negative valence of the vector in the Y direction may be used to indicate the directions of the featured line segments LR1~LR4. Assuming that 0 represents a positive value and 1 represents a negative value, the links can be expressed as LR1=(0, 0), LR2=(1, 0), LR3=(1, 1), and LR4=(0, 1).

Figure 9:
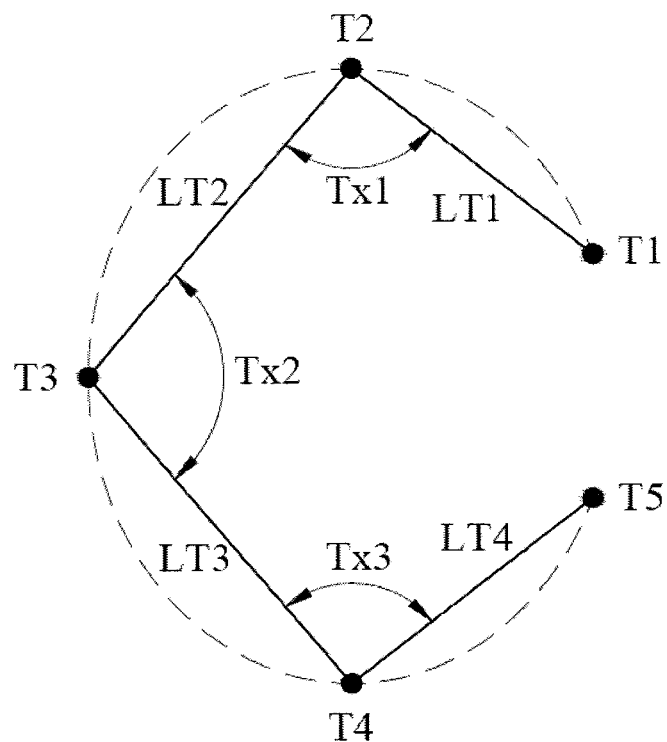
FIG. 9 shows a track of exemplificative (V) input graphic.

In another preferred aspect, the turn-analyzing unit M21 may calculate the included angle between each two said featured line segments, and insert the included angle between the two line segments as an auxiliary parameter for graphic recognition. Please refer to FIG. 9. Assuming that three featured sampling points $T_2$, $T_3$ and $T_4$, as well as a start site and an end site $T_1$ and $T_5$ are obtained from a continuous line segment after the foregoing algorithmic step, the turn-analyzing unit M21 further chronologically links the featured sampling points, $T_1$ to $T_5$, into featured line segments, LT1-LT4. Then the victors of the featured line segments LT1, LT2, LT3 and LT4 are applied to calculation based on vector inner product or the cosine rule so as to obtain three included angles Tx1, Tx2 and Tx3 between the featured line segments LT1 and LT2, LT2 and LT3, and LT3 and LT4. The included angles Tx1, Tx2, Tx3 are recorded as auxiliary parameters for subsequent graphic recognition.

In addition to the cases described previously, the turn variation may alternatively be a slope variation between two adjacent interval line segments, or an inflection point between two adjacent interval line segments (i.e. the featured sampling point where the slopes of two adjacent interval line segments are of a positive value and a negative value, respectively), and is not limited thereto.

In the event there is no featured sampling point detected (e.g. for an almost linear graphic or stroke), one or more virtual featured sampling points may be set using the turn variations and the lengths of the line segment tracks according to a weighted average thereof, for subsequent operation.

2. Space-Detecting Unit M22

Figure 10:
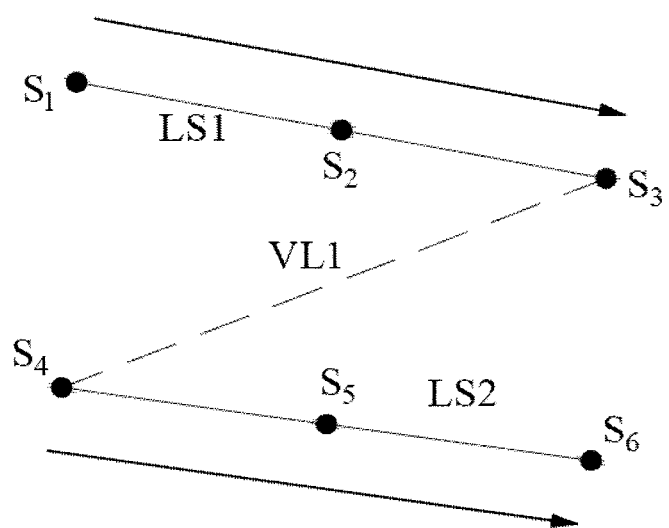
FIG. 10 shows a track of exemplificative (VI) input graphic.

The space-detecting Unit M22 is a solution for single-touch-multi-stroke applications. By inserting the interval code as an auxiliary factor for determination, the comparison to the lookup table is facilitated. When the space-detecting unit M22 detects a second gesture states, it is triggered and records a time parameter. When the time parameter in within the time threshold and another contact point is detected, an interval code corresponding to the previous and next contact points is inserted into the graphic code. In a preferred aspect, the interval code may be a simple separation sign (e.g. a block or a space), so as to separate the line segment into a front part and a back part. In another preferred aspect, when the space-detecting unit M22 detects a second gesture state, it is triggered and records a time parameter. When the time parameter in within the time threshold and the first gesture state is re-detected, the triggered site of the second gesture state and the triggered site of the re-detected first gesture state are linked to get a virtual line segment. Afterward, the code-computing unit M23 compares proportions of the virtual line segment and of the featured line segment. On the other hand, the direction of the virtual line segment or the included angle between the virtual line segment and the adjacent featured line segment is recorded as an auxiliary parameter. Afterward, the code-computing unit M23 inserts the auxiliary parameter into the graphic code for the instruction-processing module M3 to compare it to the lookup table. Please refer to FIG. 10. By a gesture of swiping twice quickly, six sampling points $S_1$~$S_6$ are made. Therein, the sampling point $S_3$ is the triggered site where the line segment LS1 detects the second gesture state. The sampling point $S_4$ is the triggered site where the line segment LS2 re-detects the first gesture state. The processor MM22 links the sampling point $S_3$ and the sampling point $S_4$, so as to obtain the virtual line segment VL1 between the sampling point $S_3$ and the sampling point $S_4$M22 and calculate the length of the virtual line segment VL1. The length of the virtual line segment VL1 and the included angle between the previous and next line segments (line segments LS1 and LS2) are used as auxiliary factors for determination and M23 accurate code comparison.

In the embodiment of contacting device 100, the first gesture state can be the event of finger contacting the touch screen 10 and the second gesture state can be the event of finger leaving the touch screen 10. In the embodiment of gesture detecting device 200, the first gesture state can be an action of fist or hand open. However, the above are the preferred embodiment of the present invention, and is not limited thereto.

3. Code-Computing Unit M23

The code-computing unit M23 serves to receive the values obtained by the turn-analyzing unit M21 and by the space-detecting unit M22. When the code-computing unit M23 obtains the length value and the included angle value of the virtual line segments and the featured line segments, the obtained value composes a graphic code, for the instruction-processing module M3 to compare with the lookup table. The code-computing unit M23 serves to record the length proportions of the featured line segments and the virtual line segment, and form a readable graphic code according to the proportions and the interval code.

Figure 11:
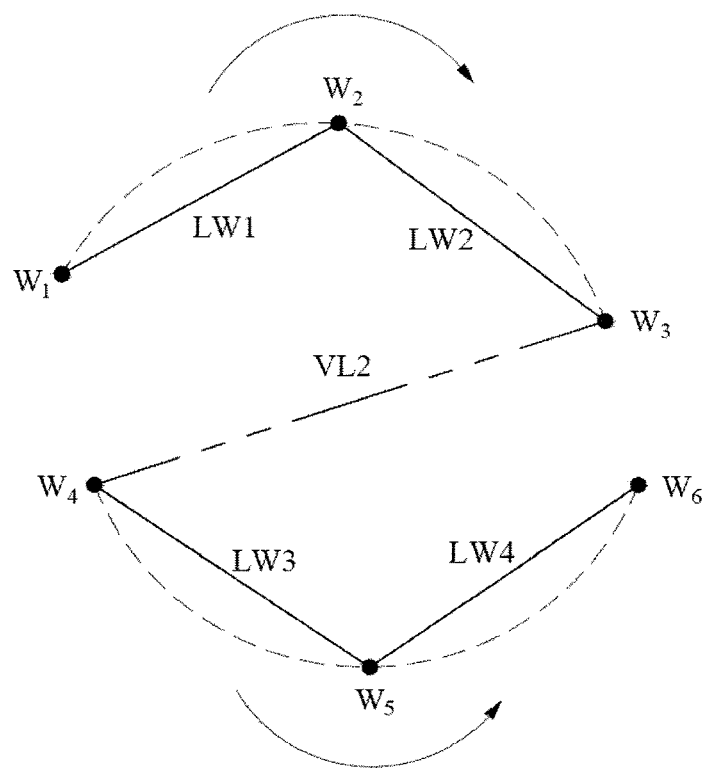
FIG. 11 shows a track of exemplificative (VII) input graphic.

The code-computing unit M23 captures the values from the turn-analyzing unit M21 and the space-detecting unit M22 in a real-time manner, so as to compose the values into a series of codes. A specific embodiment is detailed below for explanation. When the receiving the values from the turn-analyzing unit M21 and the space-detecting unit M22, the code-computing unit M23 inputs the corresponding values into the following table: [lw_n, tn, xy]. Therein, lw represents the type of the line segment (e.g. a line segment, or a space), and n is the sequence of the line segment, while tn is the length of the line segment. Further, x and y represent the positive/negative valence the line segment with respect to the X and Y directions, where 0 represents the positive valence, and 1 represents the negative valence. Please also refer to FIG. 11. When a user draws a graphic in the order indicated by the arrows, the turn-analyzing unit M21 obtains featured sampling points $W_1$ through $W_6$, and featured line segments LW1, LW2, LW3 and LW4. $W_1$ and $W_4$ are triggered sites of the first gesture state, and $W_3$ and $W_6$ are triggered sites of the second gesture state. The space-detecting unit M22 sets the interval code between the end triggered site $W_3$ and the start triggered site $W_4$. The code-computing unit M23 performs the following process. When the stroke moves from $W_1$ to $W_2$, the turn-analyzing unit M21 calculates the length and direction of the featured line segment LW1. At this time code-computing unit M23 adds the corresponding value of the featured line segment LW1, and marks it as [lw_01, t1, 00]. When the stroke moves from $W_2$ to $W_3$, the turn-analyzing unit M21 calculates the length and direction of the line segment LW2. At this time, the code-computing unit M23 adds the corresponding value of the line segment LW2, and marks it as [lw_02, t2, 01]. During another stroke, the space-detecting unit M22 calculates the length and direction of the virtual line segment VL2. At this time, the code-computing unit M23M23 adds the corresponding value of the line segment VL2, and marks it as [vl_03, t3, 11]. When the stroke moves from $W_4$ to $W_5$, the turn-analyzing unit M21 calculates the length and direction of the line segment LW3. At this time, the code-computing unit M23 adds the corresponding value of the line segment LW3, and marks it as [lw_04, t4, 01]. At last, when the stroke moves from $W_5$ to $W_6$, the turn-analyzing unit M21 calculates the length and direction of the line segment LW4. At this time, the code-computing unit M23 adds the corresponding value of the line segment LW4, and marks it as [lw_05, t5, 00]. The code-computing unit M23 stacks the foregoing tables in order, and normalizes the lengths of t1 through t5 in proportion, so as to get a graphic code {[lw_01, nt1, 00]; [lw_02, nt2, 01]; [vl_03, nt3, 11]; [lw_04, nt4, 01]; [lw_05, nt5, 00]}. The graphic code is sent to the instruction-processing module M3 for further comparison.

Figure 12:
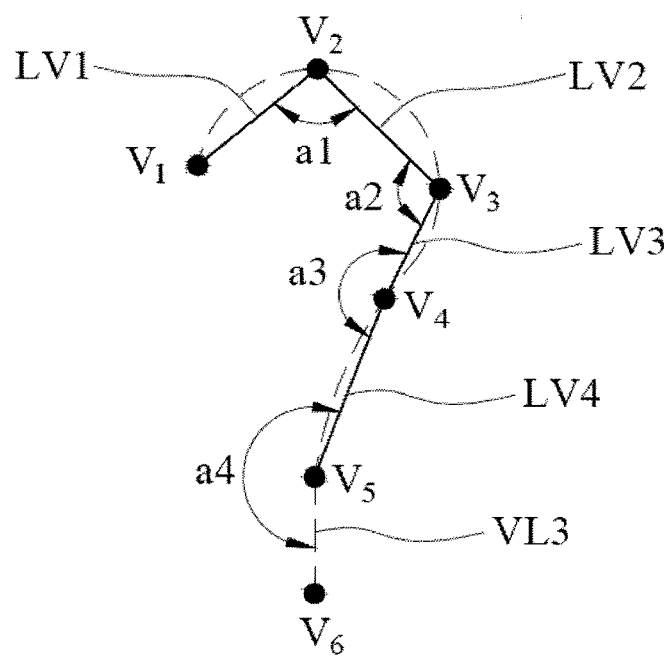
FIG. 12 shows a track of exemplificative (VIII) input graphic.

In another preferred aspect, the code-computing unit M23 takes the included angle between the adjacent featured line segment or the featured line segment and the virtual line segment as an auxiliary parameter and adds it into the graphic code, for subsequent comparison with the lookup table. Please refer to FIG. 12. A specific embodiment is described below for further explanation. When receiving the values of the turn-analyzing unit M21 and of the space-detecting unit M22, the code-computing unit M23 inputs the corresponding values into the following table: [lv_n, tn, an]. Therein, lv represents the type of the line segment (e.g. a line segment, or a space), and n is the sequence of the line segment, while tn is the length of the line segment. Further, an is the angle between the present line segment and the previous line segment. The first line segment is provided with a null value, thereby excluding it from comparison. When a user draws a graphic in the order indicated by the arrows, the turn-analyzing unit M21 obtains featured sampling points $V_1$ through $V_6$, featured line segments LV1, LV2, LV3, LV4, and space segment VL3. Therein, $V_1$ and $V_6$ are triggered sites generated when the tough screen is touched, and $V_5$ is a triggered site generated when the screen is released. The space-detecting unit M22 sets the interval code between the end triggered site $V_5$ and the start triggered site $V_6$. The code-computing unit M23 performs the following process. When the stroke moves from $V_1$ to $V_2$, turn-analyzing unit M21 calculates the length and direction of the featured line segment LV1. At this time, the code-computing unit M23 adds the corresponding value of the featured line segment LV1, and marks it as [lv_01, t1, null]. When the stroke moves from $V_2$ to $V_3$, the turn-analyzing unit M21 calculates the length and direction of the line segment LV2. At this time, the code-computing unit M23 adds the corresponding value of the line segment LV2, and marks it as [lv_02, t2, a1]. When the stroke moves from $V_3$ to $V_4$, the turn-analyzing unit M21 calculates the length and direction of the line segment LV3. At this time, the code-computing unit M23 adds the corresponding value of the line segment LV3, and marks it as [lv_03, t3, a2]. When the stroke moves from $V_4$ to $V_5$, the turn-analyzing unit M21 calculates the length and direction of the line segment LV4. At this time, the code-computing unit M23 adds the corresponding value of the line segment LV4, and marks it as [lv_04, t4, a3]. During another stroke, the space-detecting unit M22 calculates the length and direction of the virtual line segment VL3. At this time, the code-computing unit M23 adds the corresponding value of the line segment VL3, and marks it as [vl_05, t5, a4]. Since the start site of the another stork is too close to its end site (smaller than the preset threshold), the length of the line segment may be omitted in the algorithmic process and regarded as a dot graphic, and treated as the end site of the entire graphic. The code-computing unit M23 stacks the foregoing tables in order, and normalizes the lengths of t1 through t5 in proportion, so as to get a graphic code {[lv_01, nt1, null]; [lv_02, nt2, a1]; [lv_03, nt3, a2]; [lv_04, nt4, a3]; [vl_05, nt5, a4]}. The graphic code is sent to the instruction-processing module 23 for further comparison.

(III) Instruction-Processing Module M3

The instruction-processing module M3 comprises a lookup table. When the graphic code is obtained, it is compared with the code contained in the lookup table to find the predefined function. The lookup table may be preset by a system developer, or programmed by a user. It serves to link a user-input graphic to a predefined function. When the time detecting the first gesture state (time parameter)_exceeds the time threshold, the instruction-processing module M3 saves the graphic code and compares it to the code contained in the lookup table, so as to identify a function predefined as related to the graphic code. The lookup table may set the directions of featured line segments of graphic codes as indexes. During search, the potentially matched graphics and lines are first filtered out using the directions or angles of the featured line segments, and then the proportions of the lengths of the featured line segments are used to identify the corresponding graphic code, thereby quickly finding out and performing the predefined function corresponding to the graphic code. A tolerance may be set for the proportions of the lengths of the featured line segments. By adjusting the tolerance, the overall recognition accuracy can be increased or decreased.

Figure 13:
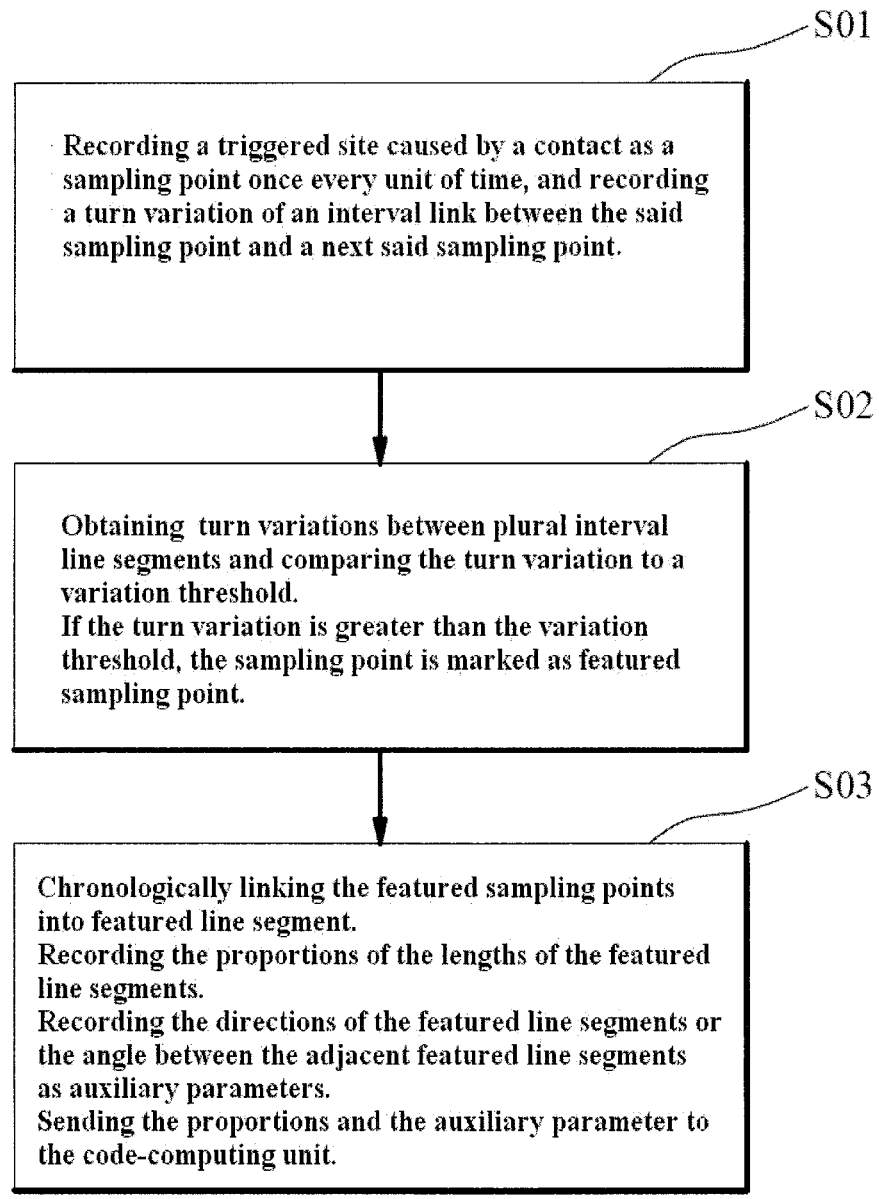
FIG. 13 is flow chart (I) of executing an input method according to the present invention.
Figure 14:
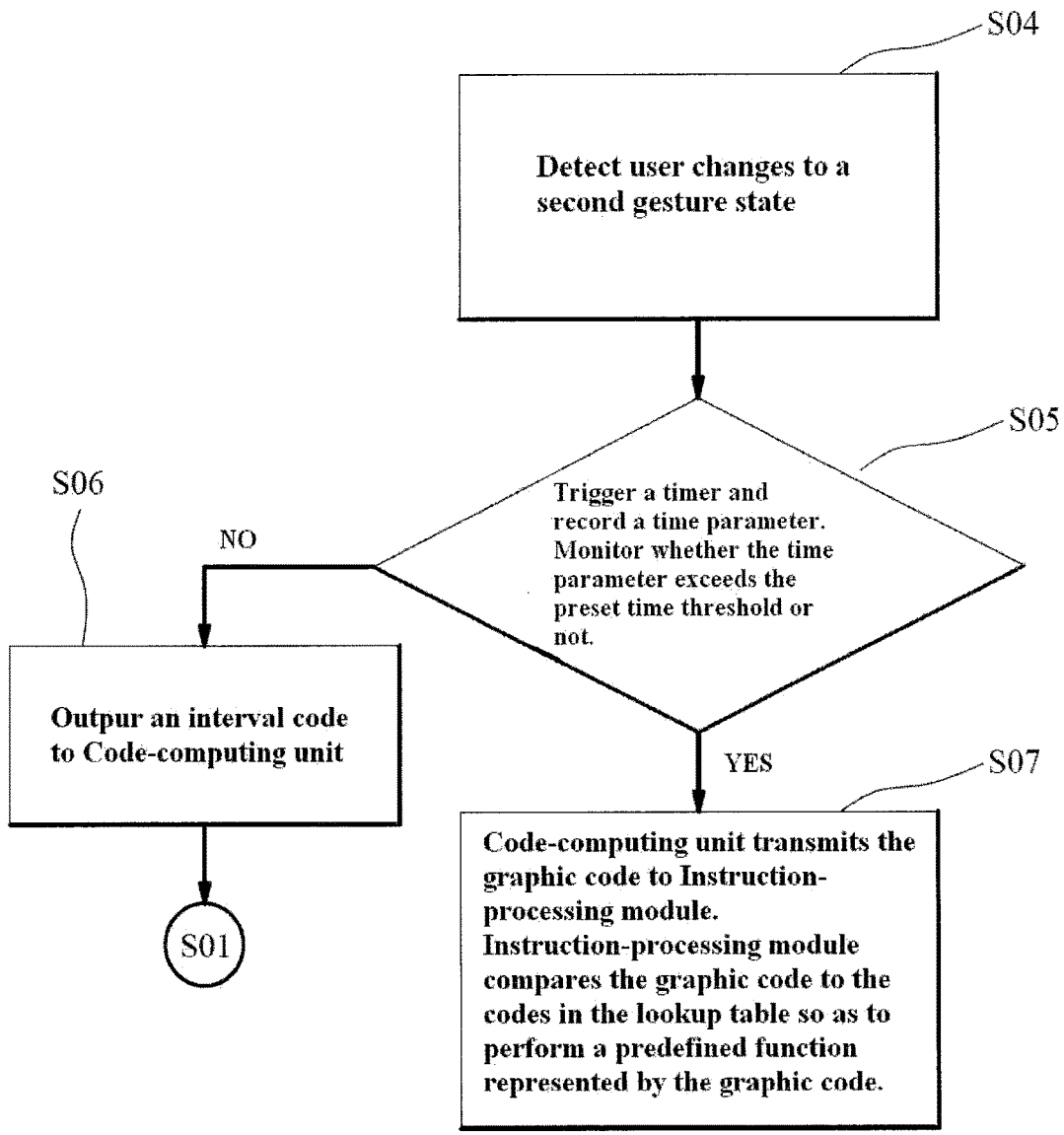
FIG. 14 is flow chart (II) of executing an input method according to the present invention.

FIG. 13 and FIG. 14 are flowcharts of the input method of the present invention.

The present invention provides an input method. The input method involves performing the following steps so as to recognize a graphic or a stroke input by a user When the user's first gesture state is detected, the gesture input process is triggered and performed. The gesture input process comprises the following steps:

A triggered site on the touch device caused by a contact point is recorded as a sampling point once every unit of time, and a turn variation of an interval link between one said sampling point and a next said sampling point is also recorded (Step S01). In a preferred aspect, the turn variation is a difference between an included angle between one said interval link and a datum line and an included angle between a previous said interval link and the datum line. In another preferred aspect, the turn variation may alternatively be a slope variation between two adjacent interval line segments, or an inflection point between two adjacent interval line segments (i.e. the featured sampling point where the slopes of two adjacent interval line segments are of a positive value and a negative value, respectively), and is not limited thereto.

After turn variations between plural interval line segments are obtained, the turn variation is compared to a variation threshold. Where the turn variation is greater than the variation threshold, the sampling point is marked as featured sampling point M23 (Step S02).

The featured sampling points are chronologically linked into featured line segment. Proportions of the lengths of the featured line segments are recorded. Then the directions of the featured line segments or the angle between the adjacent featured line segments are recorded as auxiliary parameters. The proportions and the auxiliary parameter are sent to the code-computing unit (Step S03).

Please also refer to FIG. 14. While Step S01 through S03 are performed, a side process is also performed. The side process involves detecting whether the user changes to a second gesture state, and when it is detected that the user change to second gesture state (Step S04), the following steps are performed. First, the timer is triggered to record the time parameter, and monitor whether the time parameter exceeds the preset time threshold (Step S05). If the time parameter is within the time threshold and another contact point is detected, an interval code is output to the code-computing unit M23 (Step S06). Then the method is preceded by performing Step S01 through S03.

In the event that the time parameter exceeds the time threshold, the code-computing unit M23 transmits the graphic code to the instruction-processing module M3. The instruction-processing module M3 then compares the graphic code to the codes in the lookup table, so as to perform a predefined function represented by the graphic code. (Step S07)

The method of the present invention may alternatively be realized as a computer-readable recording medium that is to be stored in a compact disk, a hard drive, a semiconductor memory device, or the like, so that by loading the computer-readable recording medium into an electronic device, the method can be performed.

The method of the present invention may alternatively be realized as a computer program product that is to be stored in a hard drive or a memory device of a web server, such as App Store, Google play, Windows Market, or other similar online platforms for release of applications, so that the computer program product can be uploaded to the server for users to use in a pay per download manner.

To sum up, the present invention solves the problems about too many or too few sampling points captured due to the varying speed of a user's input (e.g. by handwriting), and about difficulty in recognition due to the varying size of input graphics. In addition, the disclosed input method simplifies graphic recognition, and uses a special sampling scheme based on proportions of graphics and lines to improve recognition accuracy. Also, the present invention provides accurate recognition for single-touch-single-stroke operation, single-touch-multi-stroke operation, and multi-touch-single-stroke operation, and thus is much more extensively applicable application than the prior art.

While the present invention has been described in connection with certain exemplary embodiments, it is to be understood that the invention is not limited to the disclosed embodiments, but, on the contrary, intended to cover various modifications and equivalent arrangements included within the spirit and scope of the appended claims and equivalents thereof.

What is claimed is:

1. An input method for being loaded into a processor to execute following steps:
   triggering an input device to perform a gesture input process, comprising:
   recording a triggered site of a gesture as a sampling point once every unit of time, and recording a turn variation of an interval link between one said sampling point and a next said sampling point;
   comparing the turn variation to a variation threshold, and when the turn variation is greater than the variation threshold, marking the relevant sampling points as a featured sampling point;
   chronologically linking plural said featured sampling points into featured line segments, recording proportions of lengths of the featured line segments, and forming a graphic code according to the proportions; and
   comparing the graphic code to codes contained in a lookup table, so as to perform a predefined function represented by the graphic code.

2. The input method of claim 1, wherein the turn variation is a difference between an included angle between one said interval link and a datum line and an included angle between a previous said interval link and the datum line.

3. The input method of claim 2, wherein when the turn variation has a change in positive/negative valence from the previous turn variation, the sampling point is also marked as the featured sampling point.

4. The input method of claim 1, wherein the gesture input process further comprises a step of determination that includes recording directions of the featured line segments or included angles between each two said featured line segments as an auxiliary parameter, and inserting the auxiliary parameter into the graphic code that is later compared to the code contained in lookup table.

5. The input method of claim 1, wherein the gesture input process is triggered to execute when a first gesture state is detected.

6. The input method of claim 5, further comprising a step of setting a time threshold, when a second gesture state is detected, a time parameter is triggered and recorded, and when the time parameter is within the time threshold and the first gesture state is re-detected, an interval code corresponding to an interval between the previous and the present featured line segments are inserted into the graphic code.

7. The input method of claim 6, wherein when the time parameter exceeds the time threshold, the graphic code is stored and compared to the codes contained in the lookup table.

8. The input method of claim 1, further comprising a step of setting a time threshold, wherein when a second gesture state is detected, a time parameter is triggered and recorded, and when the time parameter is within the time threshold and the first gesture state is re-detected, the triggered site of the second gesture state and the triggered site of the re-detected first gesture state are linked to get a virtual line segment, and a length of the virtual line segment is recoded and used to form the graphic code together with the featured line segment according to the proportions.

9. The input method of claim 8, wherein a direction of the virtual line segment or an included angle between the virtual line segment and an adjacent said featured line segment is recorded as an auxiliary parameter, and the auxiliary parameter is inserted into the graphic code that is later compared to the codes contained in the lookup table.

10. The input method of claim 6, wherein when the time parameter exceeds the time threshold, the graphic code is stored and compared to the codes contained in the lookup table.

11. A non-transitory computer-readable recording medium, having a program recorded therein, and being configured to perform the method of claim 1 when an electronic device has been loaded with and has executed the program.

12. A computer program product, being configured to execute the method of claim 1 when being loaded into and executed by an electronic device.

13. A touch device, comprising:
   a touch screen, having an array for detecting triggered sites of contact points between a finger or a penpoint and the touch screen;
   a processor, executing the method of claim 1 when being loaded with a program.

14. A gesture detecting device, comprising:
   an image capture device for consecutively capturing an user's image;
   a processor, executing the method of claim 1 when being loaded with a program and searching out an user's gesture from the user's image.

* * * * *